US005646344A

United States Patent [19]

Konzelmann

[11] Patent Number: 5,646,344

[45] Date of Patent: Jul. 8, 1997

[54] DEVICE FOR DETERMINING A PULSATING AIR MASS FLOW IN AN INTERNAL COMBUSTION ENGINE

[75] Inventor: Uwe Konzelmann, Asperg, Germany

[73] Assignee: Robert Bosch GmbH, Stuttgart, Germany

[21] Appl. No.: 549,839

[22] PCT Filed: Mar. 30, 1995

[86] PCT No.: PCT/DE95/00436

§ 371 Date: Oct. 26, 1995

§ 102(e) Date: Oct. 26, 1995

[87] PCT Pub. No.: WO95/28560

PCT Pub. Date: Oct. 26, 1995

[30] Foreign Application Priority Data

Apr. 15, 1994 [DE] Germany .......................... 44 13 078.3

[51] Int. Cl.[6] .......................... G01D 13/02; F02D 41/04

[52] U.S. Cl. .......................... 73/204.18; 73/198; 73/861

[58] Field of Search .......................... 73/204.11, 204.18, 73/118.2, 198, 35.03, 35.04, 35.05, 861

[56] References Cited

U.S. PATENT DOCUMENTS

| | | | |
|---|---|---|---|
| 3,241,077 | 3/1966 | Smyth et al. | 328/165 |
| 4,265,125 | 5/1981 | Mahany | 73/861.03 |
| 4,311,042 | 1/1982 | Hosoya et al. | 73/204.18 X |
| 4,364,260 | 12/1982 | Chen et al. | 73/35.03 |
| 4,384,473 | 5/1983 | Brandt | 73/35.06 |
| 4,424,706 | 1/1984 | Oh | 73/35.09 X |
| 4,458,529 | 7/1984 | Nagaishi et al. | 73/204.18 |
| 4,637,245 | 1/1987 | Iwata et al. | 73/35 |
| 4,644,918 | 2/1987 | McDermott | 73/35.05 X |
| 4,651,698 | 3/1987 | McDermott et al. | 73/35.05 X |
| 4,664,083 | 5/1987 | Nix et al. | 73/35.05 X |
| 4,838,078 | 6/1989 | Tsutsumi | 73/118.2 |
| 4,850,218 | 7/1989 | Tutumi | 73/118.2 |
| 4,907,452 | 3/1990 | Yopp | 73/457 |
| 4,970,902 | 11/1990 | Misumi et al. | 73/861.23 |
| 5,069,071 | 12/1991 | McBrien et al. | 73/654 |
| 5,167,152 | 12/1992 | Shimizu et al. | 73/204.18 |
| 5,400,644 | 3/1995 | Remboski, Jr. et al. | 73/35.04 |
| 5,432,701 | 7/1995 | Mayer et al. | 73/118.2 X |

FOREIGN PATENT DOCUMENTS

| | | | |
|---|---|---|---|
| 0429819 | 10/1990 | European Pat. Off. . | |
| 63-182524 | 7/1988 | Japan | 73/118.2 |

*Primary Examiner*—George M. Dombroske
*Assistant Examiner*—Paul D. Amrozowicz
*Attorney, Agent, or Firm*—Michael J. Striker

[57] ABSTRACT

The device determines the pulsating air mass flow in an internal combustion engine. The device includes a sensor producing an output signal to be evaluated to determine a pulsating air mass flow and a filter device for filtering the output signal to produce a filtered signal in which the signal components characteristic of the air mass flow pulsations and dynamic changes are not attenuated but noise and other spurious signals are attenuated. The filter has a bandpass characteristic with an adjustable center frequency which can be varied as a function of rotation speed as well as a low-pass characteristic. A controller of the internal combustion engine is used to adjust the center frequency of the bandpass characteristic according to engine rotation speed.

5 Claims, 2 Drawing Sheets

17
10 S1 11 12 13 S2 14 S3 15 n
m̄
16

F
1
f
fs

DEVICE FOR DETERMINING A PULSATING AIR MASS FLOW IN AN INTERNAL COMBUSTION ENGINE

BACKGROUND OF THE INVENTION

The present invention relates to a device for determination of a pulsating air mass flow in an internal combustion engine, particularly in the air induction manifold of the engine.

Devices for determination of a pulsating air mass flow are known which include a sensor producing an output signal to be evaluated for determination of the air mass flow which is fed to a filter device.

In the case of an internal combustion engine, it is known for the operating parameters which normally have to be detected, for example the induction manifold pressure or the induction air mass flow, to fluctuate in time with the internal combustion engine. In addition, when using an air flowmeter to measure the induction air mass flow, noise occurs which has a number of causes. On the one hand, the air flow contains noise which is caused by turbulent fluctuating movements. This noise could be suppressed, for example, by averaging in the time domain and/or space domain. However, such averaging would not take account of the dynamic processes which occur in particular as a result of a sudden change in the air mass flow during acceleration and as a result of induction manifold pulsations in certain operating conditions.

A second noise source which has an adverse effect on the output signal is the electronic noise which is caused by electromagnetic interference. This noise must also be reduced using suitable means in order that reliable signal evaluation is possible.

In order to reduce the influence of noise and other disturbances in the evaluation of a signal from an air flowmeter, EP-0 429 819 B1 proposes that the output signal, which fluctuates cyclically in time with the internal combustion engine, of an induction manifold pressure sensor or of an air flowmeter be filtered before further processing. In this case, a band rejection filter is used to filter the cyclically fluctuating variable and is designed such that a signal appears at its output which signal reproduces the mean value of the cyclically fluctuating variable as well as possible dynamically. An adaptable center frequency of the band rejection filter is used for this purpose, the center frequency of the band rejection filter in this case varying, for example, as a function of rotation speed values determined in advance. Overall, it is proposed that the center frequency be set such that adequate attenuation of the cyclic fluctuation of the signal is achieved, so that an output signal corresponding to the mean value is produced directly at the output of the bandpass filter.

The known signal filtering has the disadvantage that a mean-value error nevertheless occurs during the process of averaging a severely fluctuating signal. This cannot be ignored, particularly in the case of air flowmeters having a curved characteristic, for example, thermal air flowmetering. Thus, in the case of thermally fast air flowmeters, the cyclically fluctuating signal elements must not be filtered out.

SUMMARY OF THE INVENTION

According to the invention the device for determination of a pulsating air mass flow in an internal combustion engine includes a sensor producing an output signal to be evaluated to determine the air mass flow and a filter device having a low-pass characteristic, a bandpass characteristic with an adjustable center frequency and means for varying the center frequency as a function of engine rotation speed so that signal components of the output signal characteristic of the pulsations of the air mass flow are not attenuated or only slightly attenuated.

In a preferred embodiment a computation device is provided which includes means for receiving and processing the filtered signal from the filter device as well as other signals from the internal combustion engine including a rotation speed signal and means for controlling the means for varying the center frequency so that the signal components of the output signal characteristic of the air mass flow pulsations are not substantially attenuated by the filter device.

The device according to the invention for the detection of a pulsating variable, for example the air mass flow supplied to an internal combustion engine, in contrast has the advantage that reliable attenuation of the disturbances superimposed on the signal is obtained even in the case of a severely fluctuating signal, without any significant errors being caused by the averaging process. It is thus also possible to use sensors having a curved characteristic, in particular thermal air flowmeters, and to filter their output signals such that they reproduce the profile of the variables to be measured, without any disturbances.

These advantages are achieved in that the output signal of a sensor, for example an air flowmeter, is supplied to a filter which, on the one hand, acts as a bandpass filter with a center frequency which is variable as a function the rotation speed, and is set such that the cyclic fluctuations in the signal are filtered as little as possible, while other signal elements, particularly the noise elements, are filtered and the filter additionally achieves a low-pass effect so that those signal elements at low frequencies are likewise not filtered or are filtered only slightly, as a result of which a rapid change in the signal is not filtered out.

It is particularly advantageous that the signal filtering can be implemented with the aid of a small number of elements which, for example, carry out a Fourier transformation, a filter function and an inverse Fourier transformation of the signal and can easily be connected in series with one another. Further advantages of the invention are achieved with the aid of the features described here and below.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE EXEMPLARY EMBODIMENT

Figure 1:
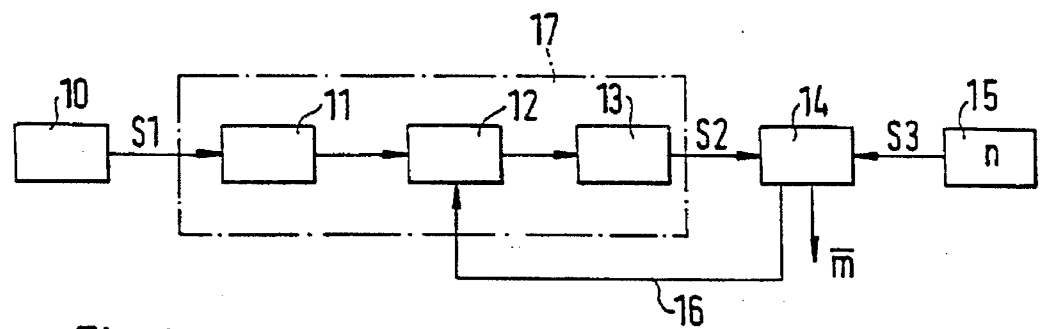
FIG. 1 is a block diagram of an exemplary embodiment of a device according to the invention for determining a pulsating air mass flow in an internal combustion engine.

FIG. 1 shows an exemplary embodiment of the invention as a block diagram. In this case, 10 designates the sensor whose output signal is intended to be evaluated. This sensor is, for example, an air flowmeter, but an induction manifold pressure sensor would also be possible.

The output signal S1 of the sensor is supplied to a stage 11 for Fourier analysis, the stage 11 is followed by a filter 12, for example a bandpass filter with a variable center frequency and low-pass characteristic, the filter 12 being followed by a stage 13 for Fourier synthesis, at whose output the signal S2 is produced, which no longer contains the disturbances which the signal S1 still has and, ideally, represents a smooth image of the variable to be detected. This variable is the air mass flow induced by an internal combustion engine, which variable pulsates in certain conditions.

Figure 3:
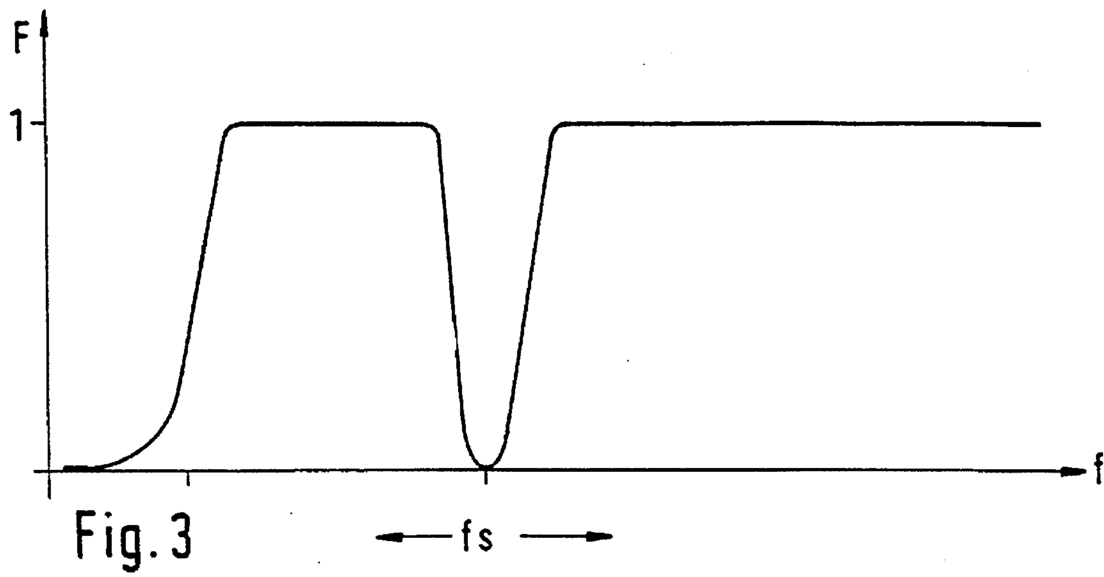
FIG. 3 is a graphical illustration showing the dependence of attenuation on frequency for a filter device according to the invention.

The stages 11, 13 and the filter 12 are indicated by way of example; they can also be combined to form a single filter device 17 or can be replaced by such a filter device 17. The essential feature is that this filter device 17 should achieve a filtering effect as is indicated in FIG. 3.

The disturbance-free signal S2 is further evaluated in a computation device 14, for example the controller of an internal combustion engine, which normally determines a mean value from the signal profile S2.

Further signals S3 are supplied to the computation device 14, for example the signals from a rotation speed sensor 15. The filter 12 is influenced, for example, by the controller 14, via the connection 16 as a function of these signals, so that the center frequency is shifted in a suitable manner.

Since, in the case of internal combustion engines, the pulsation frequency of the induced air mass flow can normally be calculated using the equation $f_p$=n/120. Z, n being the number of revolutions per minute and Z the number of cylinders, the pulsation frequency to be expected can in each case be determined as a function of the rotation speed. Since, in addition, pulsations normally occur at rotation speeds between 700 and 3,000 revolutions per minute, pulsation frequencies of 23 to 100 Hertz thus occur for a four-cylinder engine. Thus, the center frequency of the bandpass filter 12 should be within this frequency range. The center frequency must be shifted as a function of the rotation speed.

Figure 2:
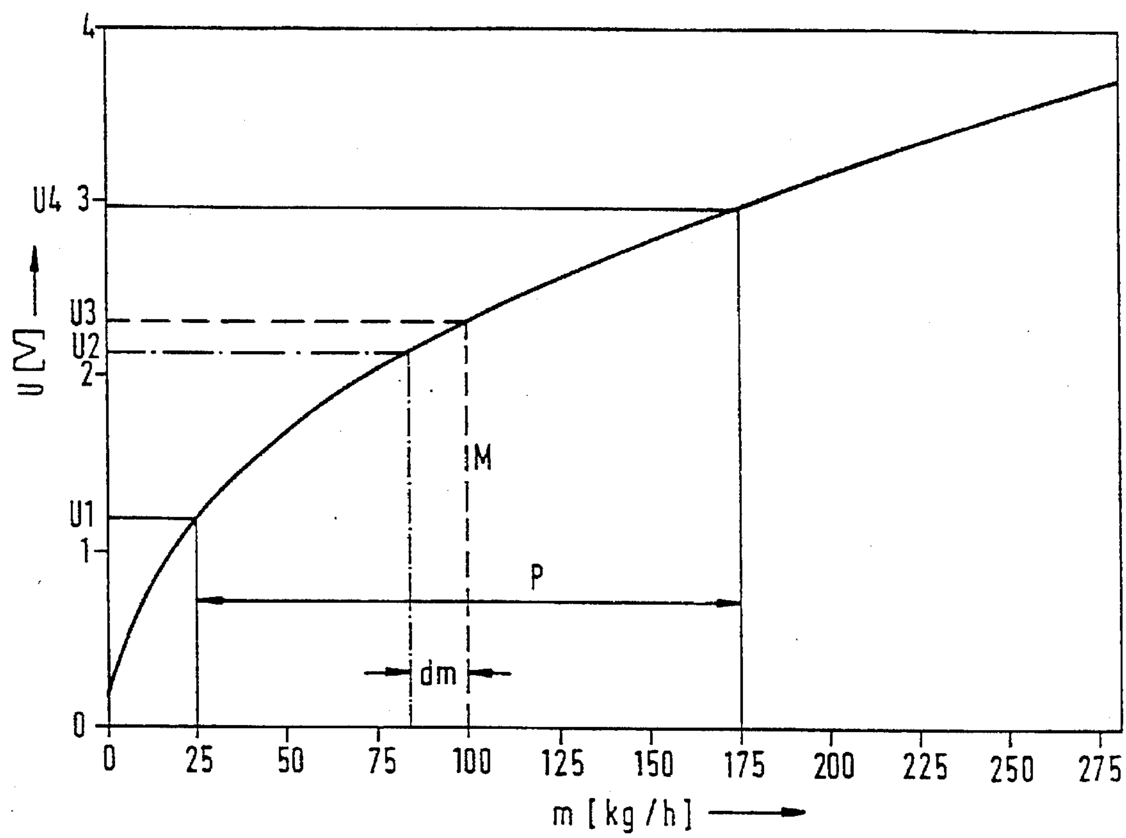
FIG. 2 is a graphical illustration of a characteristic curve of an air mass flow meter showing the relationship of voltage to air mass flow rate.

FIG. 2 indicates the characteristic curve of an air flowmeter which is intended to be evaluated using the device, according to the invention, as shown in FIG. 1. In this case, the voltage U is plotted in volts against the mass flow rate m in kilograms per hour. It can be seen that the characteristic curve is highly non-linear. The pulsation range P is between 25 and 175 kilograms per hour for a voltage of 1.2 volts to approximately 3 volts, a value of 100 kg per hour is shown as the mean flow rate value M, the indication error in the averaging of the air mass flow is averaging dm, and the associated voltages are designated U1 to U4 respectively.

FIG. 3 shows the profile of the filtering effect plotted against the frequency. It can be seen in this case that the filter 12 is set such that no filtering effect or only a very slight filtering effect occurs at low frequencies, so that a sudden change in the air mass flow, for example, is not filtered out.

The filtering effect is intended to be equal to unity in an adjacent frequency range, that is to say filtering which is as complete as possible is intended to be carried out. The filtering effect is made as low as possible in the frequency range fs which corresponds to that of the induction manifold frequency, which is dependent on the rotation speed, and the filtering effect is intended to be virtually equal to unity again in the adjacent range.

The frequency fs, which corresponds to the center frequency of the bandpass filter, is shifted by the controller as a function of the rotation speed, the adaptation being carried out as already mentioned such that the pulsations at the induction manifold frequency are attenuated as little as possible or are not attenuated.

FIGS. **4*a* to *c*** show the quality G for various filters plotted against the frequency. These relationships are known and are intended to be used only for clarification.

Figure 4A:
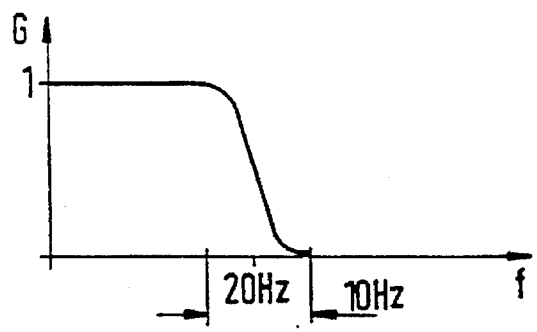
FIGS. 4*a*, 4*b* and 4*c* are graphical illustrations of the dependence of filter function on frequency for a low-pass filter and two different bandpass filters respectively.
Figure 4B:
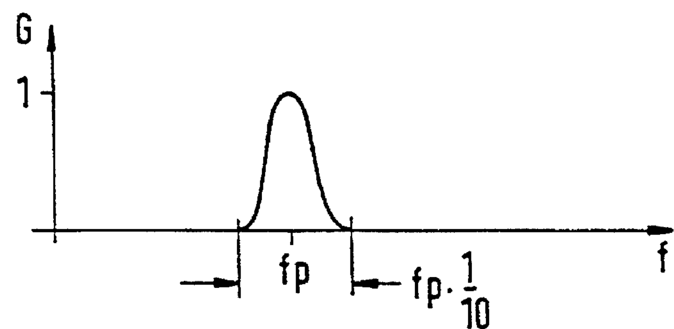
Figure 4C:
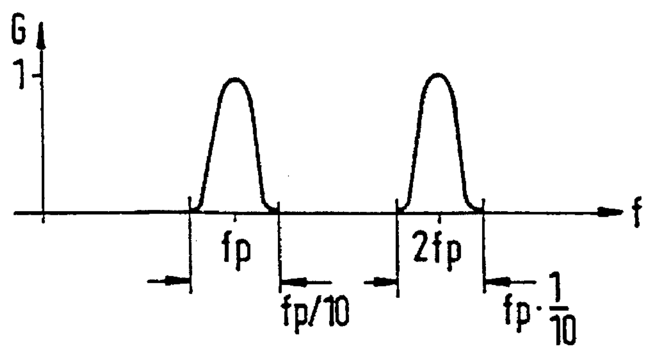

FIG. **4*a* in this case shows a low-pass filter, FIG. 4*b* a bandpass filter with a center frequency, and FIG. 4*c*** a bandpass filter having two center frequencies, which are $f_p$ and $2f_p$. The effect of these filters is in each case intended to extend over a range from $1.f_p$. 1/10.

In the case of the low-pass filter, the profile of G(f) in the range 20±10 Hz is a shifted sinusoidal function in the region of $f_p$. A filter device according to the invention can be designed by combining filters having quality profiles such as those illustrated in FIG. **4*a* to *c***.

I claim:

1. A device for determination of air mass flow in an internal combustion engine, said air mass flow having pulsations, and said device comprising a sensor producing an output signal to be evaluated for determination of said air mass flow, said output signal having signal components characteristic of the pulsations of said air mass flow; and a filter device for filtering said output signal of said sensor to form a filtered signal, said filter device having a low-pass characteristic, a bandpass characteristic with a center frequency and means for varying said center frequency of the bandpass characteristic as a function of rotation speed of the internal combustion engine so that said signal components of the output signal characteristic of the pulsations of said air mass flow are not substantially attenuated by the filter device.

2. The device as claimed in claim 1, further comprising a computation device including means for receiving and processing the filtered signal from the filter device and other signals from the internal combustion engine, said other signals including a rotation speed signal characteristic of the rotation speed of the internal combustion engine, and wherein said computation device includes means for controlling said means for varying said center frequency of the bandpass filter according to the rotation speed signal so that said signal components of the output signal characteristic of the pulsations of said air mass flow are not substantially attenuated by the filter device.

3. The device as claimed in claim 2, wherein the internal combustion engine includes a controller and said controller includes the computation device.

4. The device as claimed in claim 1, wherein other signal components of said output signal not including said signal components of the output signal characteristic of the pulsations of said air mass flow both in a frequency region above said center frequency of the bandpass filter and in a frequency region located between the center frequency and a predetermined low frequency are attenuated as completely as possible.

5. The device as claimed in claim 1, further comprising a device for Fourier analysis of the output signal of the sensor, said device for Fourier analysis being connected between the sensor and the filter device and processing the output signal from the sensor to form a Fourier transformed signal for input to the filter device, and a Fourier synthesis device connected between the filter device and the computation device for processing a filtered signal from the filter device to form a Fourier synthesis signal for input to the computation device.

* * * * *